United States Patent

Sano et al.

Patent Number: 6,143,109

Date of Patent: *Nov. 7, 2000

[54] MULTILAYER CERAMIC CAPACITOR AND PROCESS FOR PRODUCING THE SAME

[75] Inventors: Harunobu Sano, Kyoto; Yukio Hamaji, Shiga, both of Japan

[73] Assignee: Murata Manufacturing Co., Ltd., Japan

[*] Notice: This patent is subject to a terminal disclaimer.

[21] Appl. No.: 09/083,407

[22] Filed: May 22, 1998

Related U.S. Application Data

[60] Continuation of application No. 08/622,068, Mar. 26, 1996, Pat. No. 5,853,515, which is a division of application No. 08/478,026, Jun. 7, 1995, Pat. No. 5,600,533.

[30] Foreign Application Priority Data

Jun. 23, 1994 [JP] Japan ..................................... 6-141799

[51] Int. Cl.[7] ............................. B32B 31/26; H01G 4/008
[52] U.S. Cl. .................. 156/89.16; 156/233; 361/321.3; 361/321.4; 29/25.42
[58] Field of Search ............................. 156/89.14, 89.16, 156/233; 361/321.2, 321.3, 321.4; 29/25.03, 25.42

[56] References Cited

U.S. PATENT DOCUMENTS

| | | |
|---|---|---|
| 3,987,347 | 10/1976 | Burn . |
| 4,488,870 | 12/1984 | Scranton et al. . |
| 4,503,482 | 3/1985 | Hennings et al. . |
| 4,571,276 | 2/1986 | Akse . |
| 4,925,817 | 5/1990 | Ikeda et al. . |
| 5,009,744 | 4/1991 | Mandai et al. . |
| 5,117,326 | 5/1992 | Sano et al. . |
| 5,318,725 | 6/1994 | Sandhage . |
| 5,335,139 | 8/1994 | Nomura et al. . |
| 5,600,533 | 2/1997 | Sano et al. ........................... 361/321.4 |
| 5,804,132 | 9/1998 | Kawahara . |
| 5,853,515 | 12/1998 | Sano et al. ........................... 156/89.16 |
| 5,879,812 | 3/1999 | Nishiyama et al. ............. 361/321.4 X |

*Primary Examiner*—Curtis Mayes
*Attorney, Agent, or Firm*—Ostrolenk, Faber, Gerb & Soffen, LLP

[57] ABSTRACT

A multilayer ceramic capacitor and a process for producing the same, which comprises dielectric ceramic layers, internal electrodes disposed between the dielectric ceramic layers, and an external electrode connected to the internal electrodes, the dielectric ceramic layers comprising barium titanate, a bismuth compound, and an anti-reducing agent, the internal electrodes comprising nickel or a nickel alloy.

12 Claims, 1 Drawing Sheet

MULTILAYER CERAMIC CAPACITOR AND PROCESS FOR PRODUCING THE SAME

This is a continuation of application Ser. No. 08/622,068, filed Mar. 26, 1996, now U.S. Pat. No. 5,853,515, which was a division of application Ser. No. 08/478,026, filed Jun. 7, 1995 and now U.S. Pat. No. 5,600,533.

FIELD OF THE INVENTION

The present invention relates to a multilayer ceramic capacitor and a process for producing the same.

BACKGROUND OF THE INVENTION

A multilayer ceramic capacitor comprises dielectric ceramic layers, internal electrodes disposed between the dielectric ceramic layers, and an external electrode connected to these internal electrodes on both sides of the dielectric ceramic layers.

Ceramic compositions having a high dielectric constant comprising barium titanate as a major component have conventionally been used as a material for dielectric ceramic layers. In particular, a composition comprising barium titanate as a major component and, incorporated therein as a minor component, a bismuth compound, such as the titanate, stannate, and zirconate of bismuth oxide, has been widely employed from the standpoint of diminishing fluctuations of dielectric constant with temperature and voltage. The conventional dielectric ceramic layers have been formed by firing such a dielectric material at temperatures around 1,200° C.

Because of such high temperatures used for the firing of dielectric materials, substances having a high melting point and less susceptible to oxidation at high temperatures, e.g., a silver-palladium alloy and platinum, have been used as a material for internal electrodes. After the formation of dielectric ceramic layers and internal electrodes, external electrodes have been formed by baking silver, etc.

However, the use of noble metals such as platinum and silver-palladium alloys as internal electrodes has been a serious obstacle to cost reduction in multilayer ceramic capacitors, since these materials are expensive. Another problem is that the internal electrodes made of a silver-palladium alloy may suffer deterioration in properties due to silver migration. Furthermore, the internal electrodes made of platinum have a drawback that the electrodes have an increased equivalent series resistance because of the low electrical conductivity of platinum.

It has been proposed that a base metal having a high melting point, such as nickel, cobalt, and tungsten, may be used for overcoming the above-described problems. However, these base metals are so readily oxidized in a high-temperature oxidizing atmosphere that they do not function as an electrode. Therefore, for using these base materials as the internal electrodes of multilayer ceramic capacitors, it is necessary that they must be fired in a neutral or reducing atmosphere along with a dielectric material.

However, if the dielectric material described above comprising barium titanate as a major component and a bismuth compound as a minor component is fired in a neutral or reducing atmosphere, the barium titanate and bismuth oxide contained in the dielectric material are reduced and this results in a problem in that the dielectric ceramic layers thus obtained have a reduced insulation resistance.

SUMMARY OF THE INVENTION

An object of the present invention is to provide an inexpensive multilayer ceramic capacitor free from any property deterioration caused during production.

Another object of the present invention is to provide a process for producing the multilayer ceramic capacitor.

Other objects and effects of the present invention will be apparent from the following description and examples.

The present invention relates to a multilayer ceramic capacitor comprising dielectric ceramic layers, internal electrodes disposed between the dielectric ceramic layers, and an external electrode connected to the internal electrodes, the dielectric ceramic layers comprising barium titanate, a bismuth compound, and an anti-reducing agent, the internal electrodes comprising nickel or a nickel alloy.

The present invention also relates to a process for producing a multilayer ceramic capacitor which comprises the steps of:

forming, by a thin-film forming method, a nickel or nickel alloy layer on ceramic green sheets comprising barium titanate, a bismuth compound, and an anti-reducing agent;

superposing the ceramic green sheets on one another to form an assemblage; and subjecting the assemblage to high-speed firing.

In the multilayer ceramic capacitor and the process for producing the same according to the present invention, the anti-reducing agent is preferably represented by general formula:

$$\alpha MOx + \beta RO + \gamma B_2O_3 + (100-\alpha-\beta-\gamma)SiO_2$$

wherein MOx represents one member selected from the group consisting of $MnO_2$, $Li_2O$, and ZnO; R represents at least one member selected from the group consisting of Mg, Sr, Ca, and Ba; and $\alpha$, $\beta$, and $\gamma$, each indicating percentage by mole, represent numbers of $5 \leq \alpha \leq 20$, $10 \leq \beta \leq 60$, and $20 \leq \gamma \leq 35$, respectively.

DETAILED DESCRIPTION OF THE INVENTION

Figure 1:
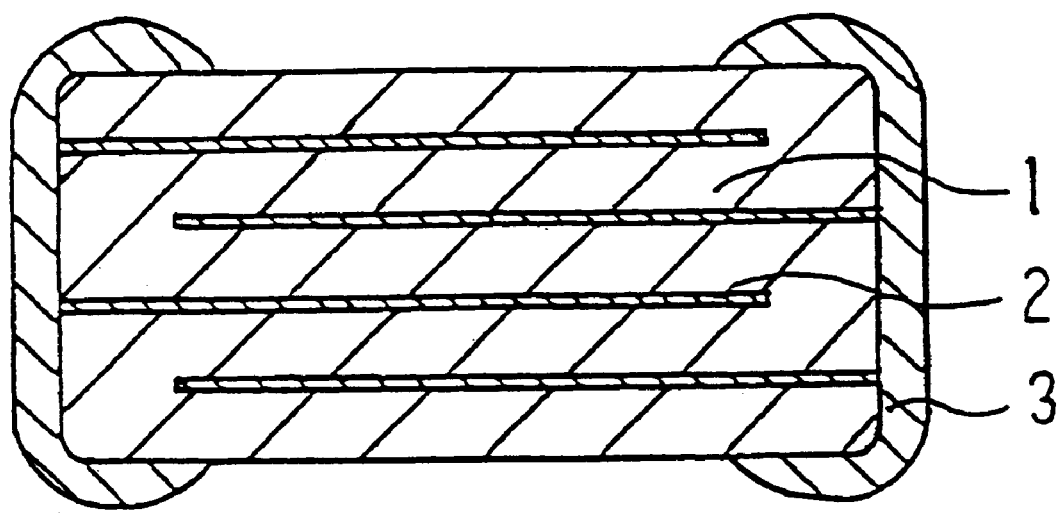
FIG. 1 is a sectional view of one embodiment of the multilayer ceramic capacitor according to the present invention.

The dielectric material used for the dielectric ceramic layer in the present invention is not particularly limited. Examples of the dielectric material include compositions containing barium titanate as a major component and a bismuth compound as a minor component, such as $aBaTiO_3 + bBi_2O_3 + cTiO_2 + dM + ePb_3O_4 + fNb_2O_5$ (wherein M is one member selected from $La_2O_3$, $CeO_2$, $Nd_2O_3$, $Sm_2O_3$, and $Y_2O_3$, and a, b, c, d, e, and f each is a constant);

$BaTiO_3 + Bi_2O_3 \cdot SnO_2 + Nd_2O_3$;

$BaTiO_3 + Bi_2O_3 \cdot SnO_2 + CaZrO_3 + MgTiO_3 + CeO_2$; and $BaTiO_3 + Bi_2O_3 \cdot ZrO_2 + CeO_2$.

The composition of the dielectric material is not particularly limited. The content of barium titanate is generally 70 wt % or more, preferably 80 wt % or more; and the content of the bismuth compound is generally 30 wt % or less, preferably 20 wt % or less, all based on the total amount of barium titanate and the bismuth compound. The content of $Bi_2O_3$ as the bismuth compound is generally 15 wt % or less, preferably 10 wt % or less, based on the total amount of barium titanate and the bismuth compound.

The dielectric material is mixed with the anti-reducing agent. The proportions of the dielectric material and the anti-reducing agent are not particularly limited, and the content of the dielectric material is generally 70 wt % or more, preferably from 80 to 99 wt %; and the content of the anti-reducing agent is generally 30 wt % or less, preferably from 1 to 20 wt %, all based on the total amount of the dielectric material and the anti-reducing agent.

The ceramic green sheet can be prepared by using the dielectric material and the anti-reducing agent along with an organic binder and a solvent. The organic binder and the solvent, as well as a method for forming the green sheet, are not particluarly limited and each may be any conventional one.

Although nickel or a nickel alloy is used as the metal film serving as an internal electrode, it is also possible to form an internal electrode consisting of two or more metal films, in which a film of copper to be alloyed with nickel was first deposited and a nickel metal film was then deposited thereon. In this case, electrical conductivity, melting point, and susceptibility to oxidation may vary depending on the kind and thickness of the metal film used in combination with nickel. Hence, the kind and thickness of the metal film used in combination with nickel can be appropriately determined from the compositions of the dielectric powder and anti-reducing agent and the use of the multilayer ceramic capacitor to be obtained.

The external electrode is not particularly limited and may be made of a suitable material such as, e.g., the same material as the internal electrodes, silver, palladium, or a silver-palladium alloy. For forming the external electrode, any known method, such as paste baking, vapor deposition, sputtering, plating, etc., can be employed.

The thin-film forming method used for forming a nickel or nickel alloy layer on ceramic green sheets preferably comprises the steps of:

forming a metal layer consisting of nickel or a nickel alloy on a resin film by a thin-film forming method;

patterning the metal layer into a form of an internal electrode by photoetching;

superposing the resin film carrying the patterned metal layer on the ceramic green sheet with the metal layer being sandwiched therebetween; and pressing the resin film and the ceramic green sheet with heating to thereby transfer the metal film to the ceramic green sheet.

As the thin-film forming method used in the present invention, at least one of a vapor deposition method, a sputtering method, and a plating method can be employed.

The material containing an anti-reducing agent, used for forming dielectric ceramic layers, can be fired in a neutral or reducing atmosphere having a partial oxygen pressure of from $10^{-6}$ to $10^{-10}$ MPa at 1,000° C. to 1,200° C., without deteriorating the properties thereof.

Copper is known as a metal which can be sintered in a neutral atmosphere having a partial oxygen pressure of about $10^{-7}$ MPa at around 1,000° C. However, copper is susceptible to oxidation even at relatively low temperatures. Hence, use of copper as a material for internal electrodes in the production of a multilayer ceramic capacitor has a drawback that if firing is conducted in an atmosphere having a partial oxygen pressure higher than the equilibrium partial oxygen pressure of Cu/CuO, diffusion of copper into the dielectric ceramic layers occurs during the firing, resulting in deteriorated properties. It is therefore necessary to precisely control the atmosphere for firing.

In contrast, nickel is less apt to undergo oxidation reaction. Use of nickel as internal electrodes is hence advantageous in that even where firing is conducted in an atmosphere having a partial oxygen pressure higher than the equilibrium partial oxygen pressure of Ni/NiO, the multilayer ceramic capacitor thus produced is less apt to suffer property deterioration if the firing used is high-speed short-time firing. Thus, the high-speed firing is preferably used in the present invention. In the high-speed firing, the temperature increasing (heating) and decreasing (cooling) rates are generally 6° C./min or more, preferably 8° C./min or more.

In particular, in the case where internal electrodes of either nickel or a nickel alloy are formed from metal films made by a thin-film forming method such as, e.g., vapor deposition, sputtering, or plating, the multilayer ceramic capacitor obtained is free from property deterioration even when the firing atmosphere used is a neutral or reducing atmosphere having a partial oxygen pressure of from $10^{-6}$ to $10^{-10}$ MPa at 1,000° C. to 1,200° C.

As apparent from the above description, according to the present invention, the dielectric ceramic layers are prevented from being reduced during firing to lower the insulation resistance of the ceramic, due to the function of the anti-reducing agent. Further, since internal electrodes are formed using nickel or a nickel alloy preferably through high-speed firing, the internal electrodes are prevented from being oxidized to cause the ceramic to have an increased dielectric loss and a reduced dielectric constant.

Moreover, since nickel or a nickel alloy is used as the material of internal electrodes, property deterioration caused by migration of an internal-electrode component can be prevented.

The use of nickel or a nickel alloy, which are less expensive than conventionally employed noble metals, as internal electrodes and the employment of high-speed firing are also effective in attaining a cost reduction.

Consequently, an inexpensive multilayer ceramic capacitor free from property deterioration caused during production can be obtained according to the present invention.

FIG. 1 is a sectional view of one embodiment of the multilayer ceramic capacitors obtained in the following Examples. In the FIGURE, numeral 1 denotes a dielectric ceramic layer containing barium titanate as a major component and a bismuth compound and an anti-reducing agent as minor components. Numeral 2 denotes an internal electrode comprising nickel or a nickel alloy, and 3 denotes an external electrode.

The present invention is then explained in more detail by means of Examples but should not be construed as being limited thereto.

EXAMPLE 1

$BaTiO_3$, $Bi_2O_3$, $TiO_2$, $CeO_2$, $Pb_3O_4$, and $Nb_2O_5$ were prepared as starting materials for a dielectric powder.

The $BaTiO_3$ was obtained from high-purity $TiCl_4$ and $Ba(NO_3)_2$ in an amount ratio of 1.000 in terms of the molar ratio of Ba ions to Ti ions. These compounds were subjected to precipitation with oxalic acid to yield a precipitate of barium titanyl oxalate ($BaTiO(C_2O_4) \cdot 4H_2O$). The precipitate was pyrolyzed at a temperature of 1,050° C. to synthesize the desired compound, which was then ground with a dry pulverizer until the average particle diameter thereof had decreased to 1 μm or smaller.

These materials were weighed out so as to yield a dielectric represented by $84.4BaTiO_3+6.8Bi_2O_3+1.9TiO_2+0.8CeO_2+4.2Pb_3O_4+1.9Nb_2O_5$ (wt %), and then wet-ground and mixed in a ball mill for 16 hours to obtain a dielectric powder having a particle diameter of 1 μm or smaller.

For obtaining anti-reducing agents represented by $\alpha Li_2O+\beta RO+\gamma B_2O_3+(100-\alpha-\beta-\gamma)SiO_2$ (wherein R is at least one member selected from Mg, Sr, Ca, and Ba, and α, β, and γ indicate percentage by mole), the necessary raw materials in the form of an oxide, carbonate, or hydroxide were weighed out so as to yield anti-reducing agents having the compositions shown in Table 1. These raw materials were wet-ground and mixed in a ball mill to obtain powders. Each powder mixture was placed in an alumina crucible, melted by heating to 1,300° C., kept molten for 1 hour, and then quenched to vitrify the contents. These vitrified mixtures were pulverized to obtain anti-reducing agents each having an average particle diameter of 1 μm.

The dielectric powder and each anti-reducing agent obtained above were mixed in the proportion shown in Table 1. Thereto were added a poly(vinyl butyral) binder, ethanol, and toluene. This mixture was treated with a ball mill for 16 hours to obtain a slurry, and then formed into sheets by the doctor blade method. Thus, ceramic green sheets were obtained.

Separately, a nickel metal film having a thickness of 1.0 μm was formed on a poly(ethylene terephthalate) film by vapor deposition. This nickel metal film was coated with a photoresist, which was then patterned into the form of an internal electrode by the photoetching method.

This poly(ethylene terephthalate) film was placed on each of the ceramic green sheets in such a manner that the nickel metal film was in contact with the ceramic green sheet. Using a hot press, the nickel metal film was then transferred to the ceramic green sheet. The ceramic green sheets to each of which the metal film had been transferred were superposed on one another to obtain an assemblage.

The assemblage was heated to 300° C. in air to burn out the organic binder, and then subjected to high-speed firing in an atmosphere composed of $H_2$, $N_2$, and $H_2O$ gases and having a partial oxygen pressure of from $10^{-6}$ to $10^{-10}$ MPa at the temperature shown in Table 1. The firing was performed under such conditions that the assemblage was first heated to the maximum temperature at a rate of from 10° C./min to 17° C./min, subsequently maintained at that temperature for 30 to 60 minutes, and then cooled to room temperature at a rate of from 8° C./min to 17° C./min.

A silver paste was applied to both sides of each of the thus-obtained sinters, and the coating was baked in a nitrogen atmosphere at 600° C. to form an external electrode electrically connected to the internal electrodes.

Thus, multilayer ceramic capacitors were obtained which had external dimensions of 0.8 mm wide, 1.6 mm long, and 0.8 mm thick, and in which the thickness of each dielectric ceramic layer between internal electrodes was 15 μm, the total number of effective dielectric ceramic layers was 20, and the counter electrode area per layer was 0.45 mm².

The electrostatic capacity (C) and dielectric loss (tan δ) of each of the multilayer ceramic capacitors were measured at a temperature of 25° C. under conditions of a frequency of 1 kHz and 1 Vrms. From the electrostatic capacity value obtained, the dielectric constant (ε) was calculated. Further, a direct current voltage of 25 V was applied for 2 minutes to measure the insulation resistance (R), and the product of the electrostatic capacity (C) and the insulation resistance, i.e., CR product, was determined. The results obtained are shown in Table 1.

As comparative samples, the following capacitor samples were produced: A dielectric powder having the same composition as in the above, i.e., represented by $84.4BaTiO_3 + 6.8Bi_2O_3 + 1.9TiO_2 + 0.8CeO_2 + 4.2Pb_3O_4 + 1.9Nb_2O_5$ (wt %), was used without the incorporation of an anti-reducing agent, to produce a multilayer ceramic capacitor (Sample No. 1-10). A low-temperature sintering agent represented by $27.9Li_2O + 7.4BaO + 5.6CaO + 5.6SrO + 44.5SiO_2 + 2.0TiO_2 + 7.0CuO$ (mol. %) was added to the same dielectric powder to produce a multilayer ceramic capacitor (Sample No. 1-11).

These comparative samples were evaluated for electric properties in the same manner as above. The results obtained are shown in Table 1.

TABLE 1

| Sample No. | Dielectric powder (wt %) | Anti-reducing agent (wt %) | Composition of anti-reducing agent (mol %) | | | | | | | Firing temperature (° C.) |
|---|---|---|---|---|---|---|---|---|---|---|
| | | | $Li_2O$ | BaO | CaO | SrO | MgO | $B_2O_3$ | $SiO_2$ | |
| 1-1 | 98 | 2 | 6 | 54 | 0 | 0 | 0 | 20 | 20 | 1,080 |
| 1-2 | 98 | 2 | 5 | 5 | 5 | 5 | 5 | 25 | 50 | 1,100 |
| 1-3 | 98 | 2 | 5 | 10 | 10 | 5 | 5 | 35 | 30 | 1,100 |
| 1-4 | 98 | 2 | 6 | 0 | 10 | 0 | 0 | 34 | 50 | 1,040 |
| 1-5 | 98 | 2 | 20 | 5 | 5 | 5 | 5 | 30 | 30 | 1,040 |
| 1-6 | 98 | 2 | 5 | 15 | 15 | 10 | 5 | 20 | 30 | 1,080 |
| 1-7 | 96 | 4 | 5 | 15 | 15 | 10 | 5 | 20 | 30 | 1,020 |
| 1-8 | 90 | 10 | 5 | 15 | 15 | 10 | 5 | 20 | 30 | 960 |
| 1-9 | 80 | 20 | 5 | 15 | 15 | 10 | 5 | 20 | 30 | 920 |
| 1-10* | 100 | 0 | — | — | — | — | — | — | — | 1,180 |
| 1-11* | 96 | 4** | — | — | — | — | — | — | — | 1,060 |

| Sample No. | Electric properties | | |
|---|---|---|---|
| | Dielectric constant ε | Dielectric loss tan δ (%) | CR product (Ω · F) |
| 1-1 | 2,120 | 2.0 | 4,100 |
| 1-2 | 2,090 | 2.2 | 3,400 |
| 1-3 | 1,950 | 2.1 | 4,000 |
| 1-4 | 2,050 | 2.4 | 3,500 |
| 1-5 | 1,900 | 2.0 | 4,300 |
| 1-6 | 1,930 | 2.4 | 3,700 |
| 1-7 | 1,780 | 1.9 | 3,100 |
| 1-8 | 1,320 | 1.8 | 2,700 |

TABLE 1-continued

| 1-9 | 1,050 | 2.3 | 2,100 |
|---|---|---|---|
| 1-10* | | (unable to be measured) | |
| 1-11* | 1,550 | 10.8 | 200 |

Note:
*Comparative sample
**Low-temperature sintering agent

EXAMPLE 2

$BaTiO_3$, $Bi_2O^3$, $ZrO_2$, and $CeO_2$ were prepared as starting materials for a dielectric powder. The $BaTiO_3$ used was the same as in Example 1.

These materials were weighed out so as to yield a dielectric represented by $93.6BaTiO_3+3.3Bi_2O_3+2.6ZrO_2+0.5CeO_2$ (wt %), and then wet-ground and mixed in a ball mill for 16 hours to obtain a dielectric powder having a particle diameter of 1 μm or smaller.

Anti-reducing agents represented by $\alpha MnO_2+\beta RO+\gamma B_2O_3+(100-\alpha-\beta-\gamma)SiO_2$ (wherein R is at least one member selected from Mg, Sr, Ca, and Ba, and α, β, and γ indicate percentage by mole) and having the compositions shown in Table 2 were produced in the same manner as in Example 1.

Each of these anti-reducing agents was added to the dielectric powder in the proportion shown in Table 2. Multilayer ceramic capacitors were then produced in the same manner as in Example 1.

Electric properties of these multilayer ceramic capacitors were measured in the same manner as in Example 1. The results obtained are shown in Table 2.

Separately, a nickel powder paste having a particle diameter of 0.5 μm was applied by screen printing to the same dielectric ceramic green sheets as in Sample No. 2-3 to form internal electrodes. These ceramic green sheets were superposed, and the resulting assemblage was treated in the same manner as in Example 1 to produce a multilayer ceramic capacitor (Sample No. 2-10).

TABLE 2

| Sample No. | Dielectric powder (wt %) | Anti-reducing agent (wt %) | Composition of anti-reducing agent (mol %) | | | | | | | Firing temperature (° C.) |
|---|---|---|---|---|---|---|---|---|---|---|
| | | | $Li_2O$ | BaO | CaO | SrO | MgO | $B_2O_3$ | $SiO_2$ | |
| 2-1 | 98 | 2 | 6 | 54 | 0 | 0 | 0 | 20 | 20 | 1,180 |
| 2-2 | 98 | 2 | 5 | 5 | 5 | 5 | 5 | 25 | 50 | 1,200 |
| 2-3 | 98 | 2 | 5 | 10 | 10 | 5 | 5 | 35 | 30 | 1,180 |
| 2-4 | 98 | 2 | 6 | 0 | 10 | 0 | 0 | 34 | 50 | 1,160 |
| 2-5 | 98 | 2 | 20 | 5 | 5 | 5 | 5 | 30 | 30 | 1,160 |
| 2-6 | 98 | 2 | 5 | 15 | 15 | 10 | 5 | 20 | 30 | 1,180 |
| 2-7 | 96 | 4 | 5 | 15 | 15 | 10 | 5 | 20 | 30 | 1,120 |
| 2-8 | 90 | 10 | 5 | 15 | 15 | 10 | 5 | 20 | 30 | 1,100 |
| 2-9 | 80 | 20 | 5 | 15 | 15 | 10 | 5 | 20 | 30 | 1,060 |
| 2-10 | 98 | 2 | 5 | 10 | 10 | 5 | 5 | 35 | 30 | 1,160 |

| Sample No. | Electric properties | | |
|---|---|---|---|
| | Dielectric constant ε | Dielectric loss tan δ (%) | CR product (Ω · F) |
| 2-1 | 2,730 | 2.3 | 3,900 |
| 2-2 | 2,850 | 2.4 | 4,400 |
| 2-3 | 2,650 | 2.4 | 4,100 |
| 2-4 | 2,590 | 2.2 | 3,100 |
| 2-5 | 2,520 | 2.2 | 3,500 |
| 2-6 | 2,360 | 2.1 | 3,200 |
| 2-7 | 2,110 | 2.2 | 3,100 |
| 2-8 | 1,830 | 1.9 | 2,800 |
| 2-9 | 1,340 | 2.5 | 2,000 |
| 2-10 | 200 | 15.2 | 1,100 |

EXAMPLE 3

A dielectric powder represented by $93.6BaTiO_3+3.3Bi_2O_3+2.6ZrO_2+0.5CeO_2$ (wt %) and having a particle diameter of 1 μm or smaller was obtained in the same manner as in Example 2.

Anti-reducing agents represented by $\alpha ZnO_2+\beta RO+\gamma B_2O_3+(100-\alpha-\beta-\gamma)SiO_2$ (wherein R is at least one member selected from Mg, Sr, Ca, and Ba, and α, β, and γ indicate percentage by mole) and having the compositions shown in Table 3 were produced in the same manner as in Example 1.

Each of these anti-reducing agents was added to the dielectric powder in the proportion shown in Table 3. Multilayer ceramic capacitors were then produced in the same manner as in Example 1.

Electric properties of these multilayer ceramic capacitors were measured in the same manner as in Example 1. The results obtained are shown in Table 3.

Separately, the same assemblage as for Sample No. 3-3 was heated to 300° C. in air to burn out the organic binder, and then fired at 1,200° C. in an atmosphere composed of $H_2$, $N_2$, and $H_2O$ gases and having a partial oxygen pressure of from $10^{-6}$ to $10^{-10}$ MPa. The firing was performed under such conditions that the assemblage was first heated to 1,200° C. at a rate of 3.0° C./min, subsequently maintained at that temperature for 2 hours, and then cooled to room temperature at a rate of 2.0° C./min.

The subsequent procedure was carried out in the same manner as in Example 1 to complete a multilayer ceramic capacitor.

An external electrode was then formed on the thus-obtained sinter in the same manner as in Example 1 to fabricate a multilayer ceramic capacitor (Sample No. 3-10).

Electric properties of this multilayer ceramic capacitor were measured in the same manner as in Example 1. The results obtained are shown in Table 3.

In contrast, the capacitor produced without incorporation of an anti-reducing agent, i.e., Sample No. 1-10 as a comparative sample, does not have the properties required of capacitors. The capacitor produced using a low temperature sintering aid in place of an anti-reducing agent, i.e., Sample No. 1-11 as a comparative sample, has an increased dielectric loss and a reduced insulation resistance and is hence unusable as a multilayer ceramic capacitor.

The capacitor having internal electrodes formed from a paste by screen printing without using a thin-film forming method, i.e., Sample No. 2-10, has a relatively reduced dielectric constant and a relatively increased dielectric loss due to the oxidation of the internal electrodes. Thus, it is understood that the thin-film forming method is preferably used in the present invention.

The capacitor produced without conducting high-speed firing, i.e., Sample No. 3-10, has a relatively increased

TABLE 3

| Sample No. | Dielectric powder (wt %) | Anti-reducing agent (wt %) | Composition of anti-reducing agent (mol %) | | | | | | | Firing temperature (° C.) |
|---|---|---|---|---|---|---|---|---|---|---|
| | | | $Li_2O$ | BaO | CaO | SrO | MgO | $B_2O_3$ | $SiO_2$ | |
| 3-1 | 98 | 2 | 6 | 54 | 0 | 0 | 0 | 20 | 20 | 1,180 |
| 3-2 | 98 | 2 | 5 | 5 | 5 | 5 | 5 | 25 | 50 | 1,180 |
| 3-3 | 98 | 2 | 5 | 10 | 10 | 5 | 5 | 35 | 30 | 1,200 |
| 3-4 | 98 | 2 | 6 | 0 | 10 | 0 | 0 | 34 | 50 | 1,160 |
| 3-5 | 98 | 2 | 20 | 5 | 5 | 5 | 5 | 30 | 30 | 1,160 |
| 3-6 | 98 | 2 | 5 | 15 | 15 | 10 | 5 | 20 | 30 | 1,180 |
| 3-7 | 96 | 4 | 5 | 15 | 15 | 10 | 5 | 20 | 30 | 1,120 |
| 3-8 | 90 | 10 | 5 | 15 | 15 | 10 | 5 | 20 | 30 | 1,100 |
| 3-9 | 80 | 20 | 5 | 15 | 15 | 10 | 5 | 20 | 30 | 1,060 |
| 3-10 | 98 | 2 | 5 | 10 | 10 | 5 | 5 | 35 | 30 | 1,200 |

| Sample No. | Electric properties | | |
|---|---|---|---|
| | Dielectric constant ε | Dielectric loss tan δ (%) | CR product (Ω · F) |
| 3-1 | 2,810 | 2.4 | 3,700 |
| 3-2 | 2,870 | 2.4 | 3,900 |
| 3-3 | 2,750 | 2.2 | 4,300 |
| 3-4 | 2,620 | 2.3 | 3,200 |
| 3-5 | 2,510 | 2.1 | 3,400 |
| 3-6 | 2,300 | 2.0 | 3,300 |
| 3-7 | 2,010 | 2.2 | 3,000 |
| 3-8 | 1,780 | 1.9 | 2,600 |
| 3-9 | 1,290 | 2.5 | 2,100 |
| 3-10 | 1,560 | 5.8 | 1,600 |

EXAMPLE 4

Using the same dielectric powder and the same anti-reducing agents as in Example 1, multilayer ceramic capacitors were fabricated in the same manner as in Example 1, except that a metal film formed by depositing a 0.1 μm-thick copper film by vapor deposition and then forming thereon a 0.9 μm-thick nickel film by electroless plating was used in place of the 1.0 μm-thick vapor-deposited nickel film as the metal film deposited by a thin-film forming method and serving as the material for internal electrodes.

Electric properties of these multilayer ceramic capacitors were measured in the same manner as in Example 1. As a result, the properties obtained were substantially the same as in Example 1, in which a vapor-deposited nickel film was used.

As the above Examples show, the multilayer ceramic capacitors of the present invention not only have a relatively high dielectric constant and a low dielectric loss, but also have a high insulation resistance and a satisfactory CR product of 2,000 Ω·F. or higher.

dielectric loss due to some oxidation of the internal electrodes. Thus, it is understood that the high-speed firing is preferably used in the present invention.

While the invention has been described in detail and with reference to specific examples thereof, it will be apparent to one skilled in the art that various changes and modifications can be made therein without departing from the spirit and scope thereof.

What is claimed is:

1. A process for producing a multilayer ceramic capacitor which comprises the steps of:

forming, by a thin-film forming method, a nickel or nickel alloy layer on ceramic green sheets comprising barium titanate, a bismuth oxide compound, and an anti-reducing agent;

superposing said ceramic green sheets on one another to form an assemblage; and subjecting said assemblage to high-speed firing in a neutral or reducing atmosphere at a heating and cooling rate of 10° C. per minute or greater.

2. A process for producing a multilayer ceramic capacitor as claimed in claim 1, wherein said anti-reducing agent is represented by general formula:

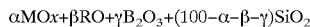

wherein MOx represents one member selected from the group consisting of $MnO_2$, $Li_2O$, and ZnO; R represents at least one member selected from the group consisting of Mg, Sr, Ca, and Ba; and $\alpha$, $\beta$, and $\gamma$, each indicating percentage by mole, represent numbers of $5 \leq \alpha \leq 20$, $10 \leq \beta \leq 60$, and $20 \leq \gamma \leq 35$, respectively.

3. A process for producing a multi-layer ceramic capacitor as claimed in claim 2, wherein the high-speed firing comprises heating the assemblage at an oxygen partial pressure of $10^{-6}$ to $10^{-10}$ MPa to a temperature in the range of 920° to 1200° C.

4. A process for producing a multi-layer ceramic as claimed in claim 3, in which the temperature is 1000–1180° C.

5. A process for producing a multilayer ceramic capacitor as claimed in claim 1, wherein said thin-film forming method for forming a nickel or nickel alloy layer on ceramic green sheets comprises the steps of:

forming a metal layer consisting of nickel or a nickel alloy on a resin film by a thin-film forming method;

patterning said metal layer into a form of an internal electrode by photoetching;

superposing said resin film carrying said patterned metal layer on said ceramic green sheet with said metal layer being sandwiched therebetween; and pressing said resin film and said ceramic green sheet with heating to thereby transfer said metal layer to said ceramic green sheet.

6. A process for producing a multi-layer ceramic capacitor as claimed in claim 5, wherein the high-speed firing comprises heating the assemblage at an oxygen partial pressure of $10^{-6}$ to $10^{-10}$ MPa to a temperature in the range of 920° to 1200° C.

7. A process for producing a multi-layer ceramic as claimed in claim 6 in which the temperature is 1000–1180° C.

8. A process for producing a multilayer ceramic capacitor as claimed in claim 1, wherein said thin-film forming method is at least one selected from the group consisting of a vapor deposition method, a sputtering method, and a plating method.

9. A process for producing a multi-layer ceramic capacitor as claimed in claim 1, wherein the high-speed firing comprises heating the assemblage at an oxygen partial pressure of $10^{-6}$ to $10^{-10}$ MPa to a temperature in the range of 920° to 1200° C.

10. A process for producing a multi-layer ceramic as claimed in claim 9 in which the temperature is 1000–1180° C.

11. A process for producing a multi-layer ceramic as claimed in claim 9 in which the amount of anti-reducing agent is 30 weight percent or less based on the total amount of the dielectric material in an anti-reducing agent.

12. A process for producing a multilayer ceramic as claimed in claim 11 in which the amount of anti-reducing agent is from 1–20 weight percent based on the total amount of the dielectric material and the anti-reducing agent.

* * * * *